May 26, 1964
E. P. HAEN ETAL
3,134,478
TUBE FEEDER
Filed March 22, 1960
3 Sheets-Sheet 1
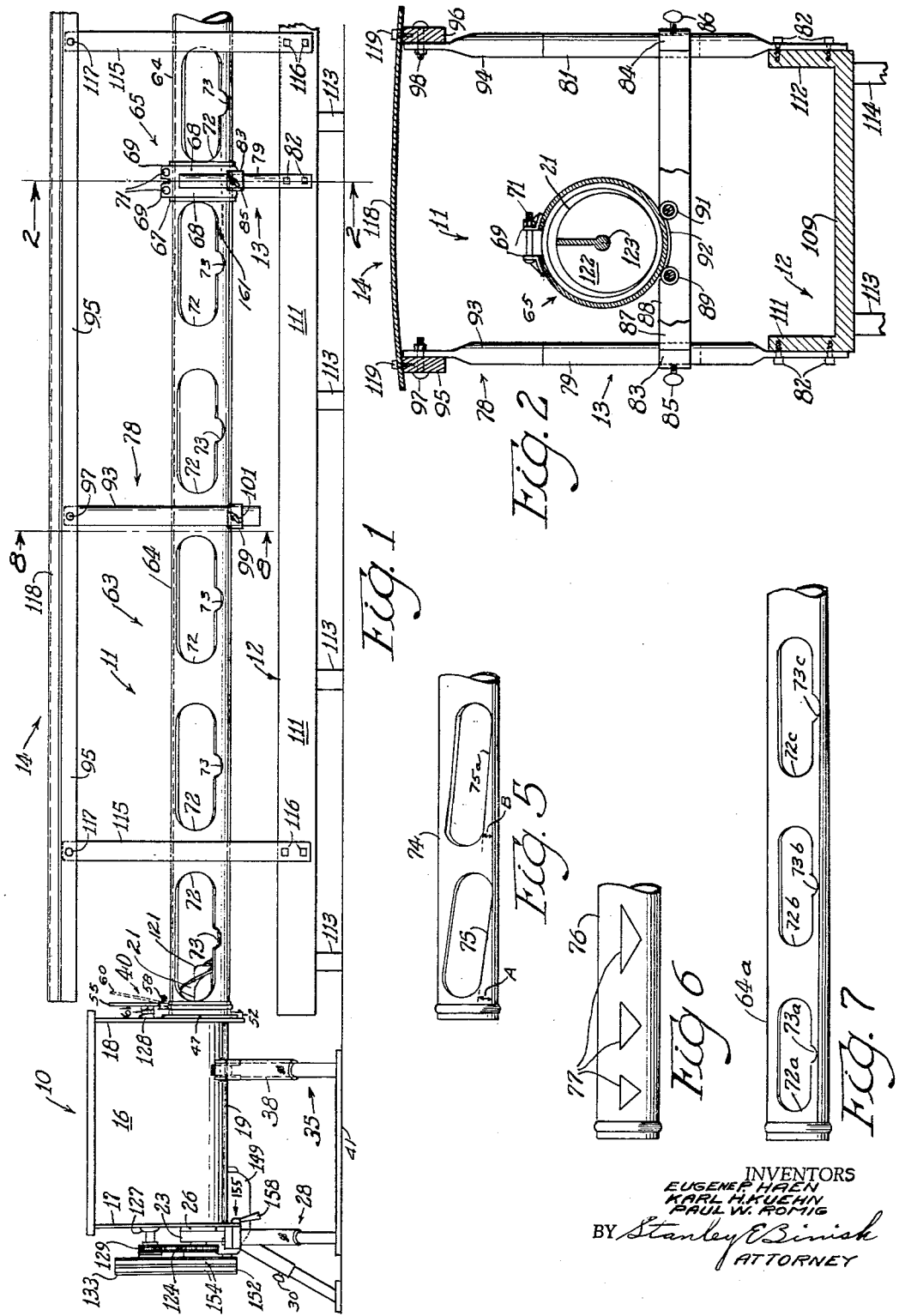
INVENTORS
EUGENE P. HAEN
KARL H. KUEHN
PAUL W. ROMIG
BY Stanley E. Binish
ATTORNEY

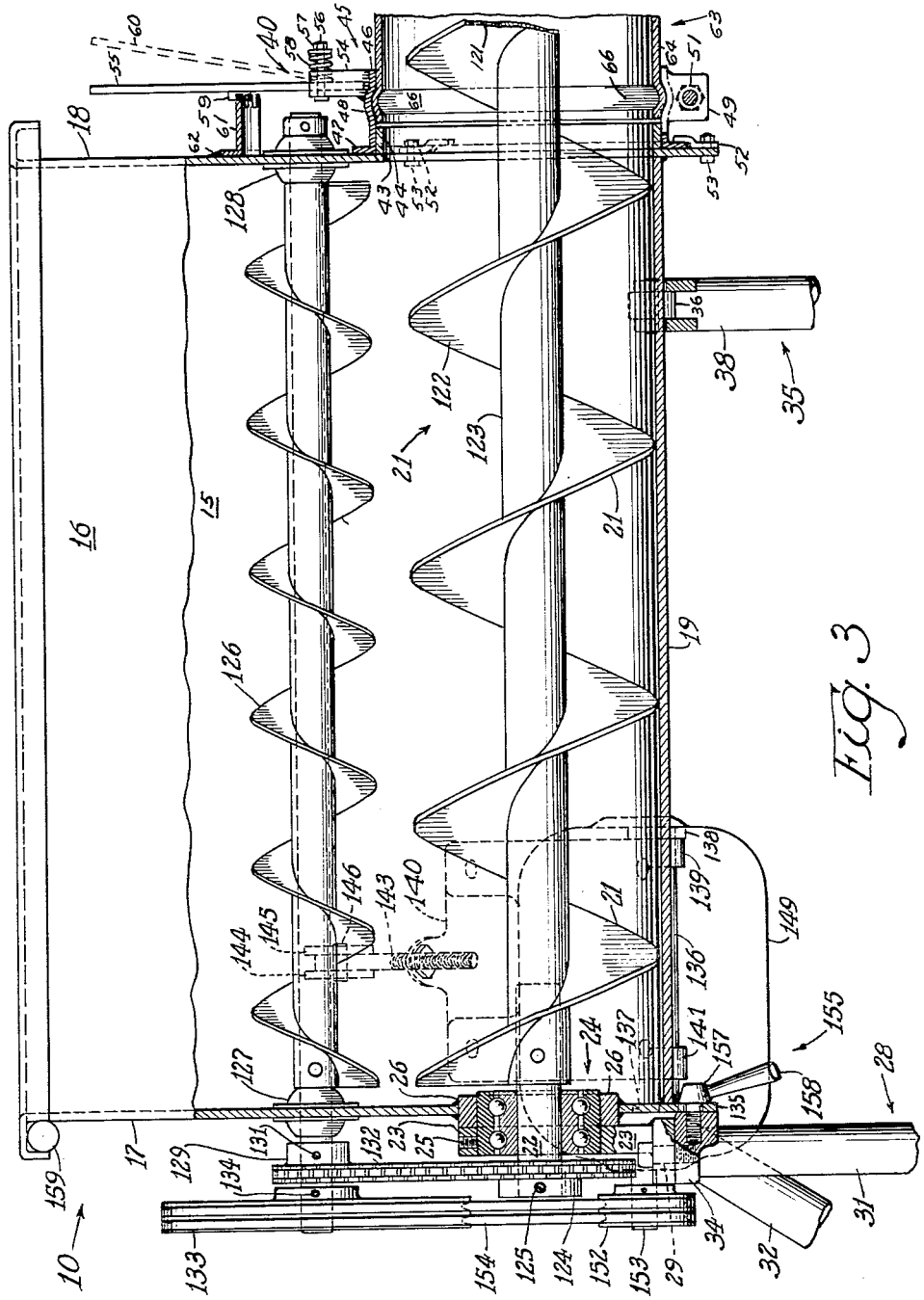

May 26, 1964  E. P. HAEN ETAL  3,134,478
TUBE FEEDER

Filed March 22, 1960  3 Sheets-Sheet 3

INVENTORS
EUGENE P. HAEN
KARL H. KUEHN
PAUL W. ROMIG
BY Stanley E. Binish
ATTORNEY United States Patent Office 3,134,478
Patented May 26, 1964

3,134,478
TUBE FEEDER
Eugene P. Haen, Holland, Karl H. Kuehn, Kaukauna, and Paul W. Romig, Allouez, Wis., assignors to Badger Northland, Inc., Kaukauna, Wis., a corporation of Wisconsin
Filed Mar. 22, 1960, Ser. No. 16,784
2 Claims. (Cl. 198—64)

This invention relates generally to auger conveyors, and more particularly to an auger type conveyor for transporting and depositing material such as forage, at stations along a feed bunk, in controlled metered quantities, and having an associated rotatable supply hopper.

The general purpose of this invention is to provide new and useful improvements in feed conveyor systems; to eliminate the unsatisfactory conveyance of feed concentrates, such as pelleted protein or the like, when introduced in a conveyor tube primarily for conveying coarse forage, such as ensilage; and to eliminate the detrimental effects of rain, snow and ice in the supply hopper.

An object of this invention is the provision of an improved auger feed conveyor system, including a supply hopper rotatable substantially about the axis of the conveyor auger, whereby the hopper may be disposed tilted to one side to prevent the entry of detrimental rain, snow, and ice, in the hopper when not in use.

Another object is to provide an improved feed conveyor which includes an elongated conveying tube having delivery openings along a side thereof, said openings including a lower notch portion for the discharge of feed concentrates in pellet, granulated or powdered form.

Still another object of this invention is the provision of an improved tubular feed conveyor including novel coupling means for the conveyor tubes thereof.

Yet another object is to provide an improved feed conveyor including elongated delivery tube means having elongated discharge openings along a side thereof disposed diagonally of the longitudinal axis of the tube.

A further object of this invention is the provision of an improved feed conveyor which includes a horizontally disposed elongated delivery tube means having discharge openings along a side of said tube, said openings being elongated longitudinally, the lower edge of all openings lying in the same horizontal plane, and the openings being progressively wider, from one end of the tube to the other, whereby an even discharge of material from the progressively variable discharge openings is facilitated.

Still a further object is to provide a hopper construction that allows material to pass therethrough without "bridging" or clogging at the discharge opening thereof.

Yet a further object of this invention is the provision of an improved auger feed conveyor system including an elongated delivery tube having discharge openings along the side thereof and an associated feed bunk, wherein the support means for the delivery tube are disposed astraddle the feed bunk, thereby achieving a construction featuring a bunk free and clear of obstructions and easy to keep clean.

Another object is to provide an auger feed system wherein the support means for the delivery tube are mounted pending from an overhead roof structure.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a fragmentary side elevation view of the invention, broken off at the right end, and showing the rotatable supply hopper, notches in the discharge openings of the tubes, roof structure, feed bunk, and tube conveyor means;

FIG. 2 is an enlarged section view taken on line 2—2 of FIG. 1, showing the tube support means in detail;

FIG. 3 is an enlarged fragentary side elevation, partly in section, showing the supply hopper, the drive means, means connecting the delivery tube to the hopper, and the control means for rotating the delivery tube means about its axis;

FIG. 5 is a side elevation of a modified delivery tube, showing progressively elongated discharge openings disposed diagonally of the longitudinal axis of the tube, and showing the diagonal angle decreasing progressively toward the end of the tube;

FIG. 6 is a side elevation of a modified delivery tube, showing triangular discharge openings in the delivery tube;

FIG. 7 is a side elevation of a modified tube, showing progressively elongated discharge openings and progressively wider notches therein.

Figure 4:
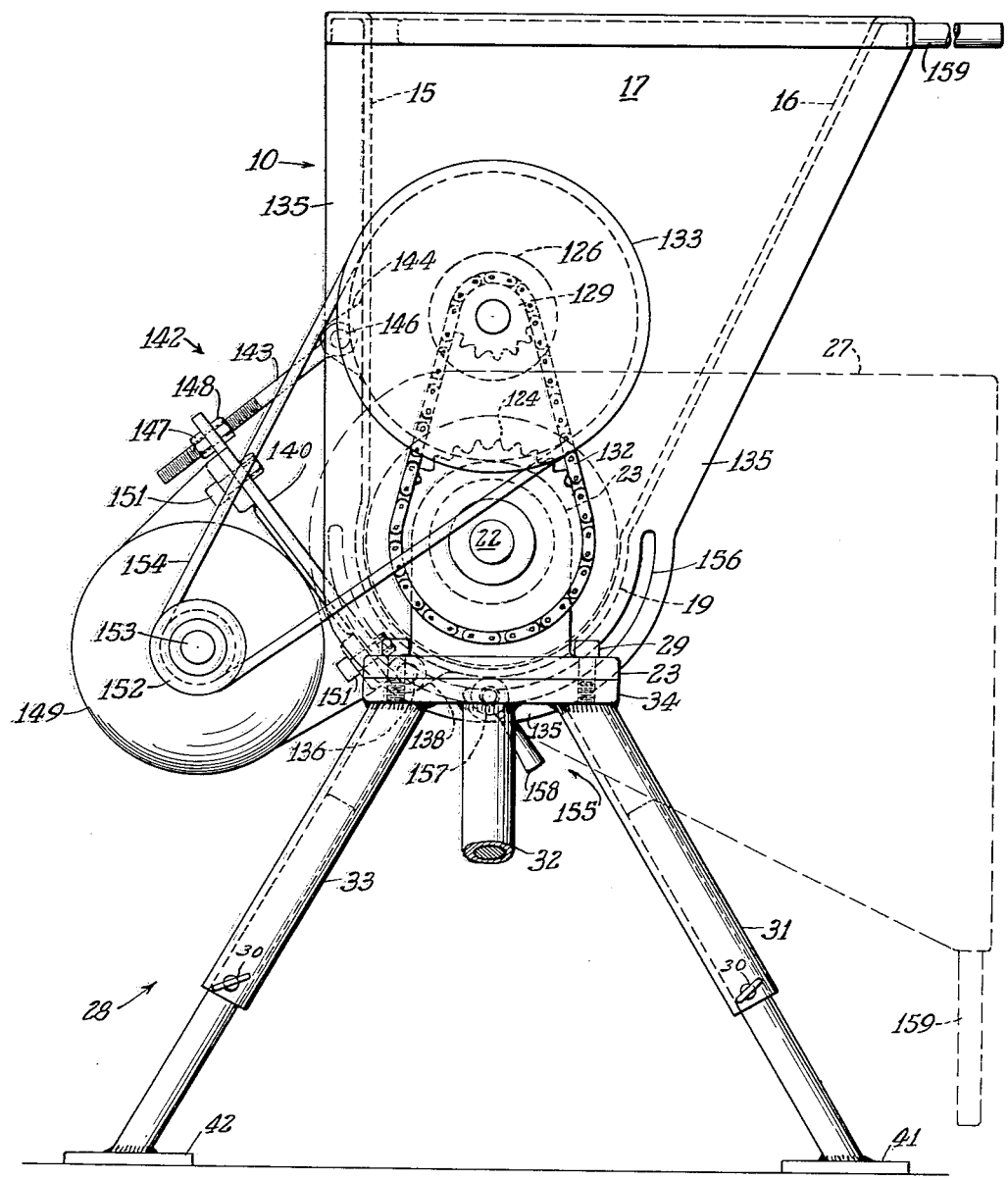
FIG. 4 is an enlarged front end elevation of the hopper, showing the means for rotating the hopper about the axis of the conveyor auger, and also showing the drive means.

Referring now to the drawings, wherein like reference characters designate like or corresponding parts throughout the several views there is shown in FIG. 1 a supply hopper generally indicated at 10 connected with outgoing auger type conveyor means generally indicated at 11. Said conveyor means is supported astraddle a feed bunk generally indicated at 12, by means of a plurality of supporting frames generally indicated at 13 disposed at delivery tube ends. A roof structure, generally indicated at 14, provides a cover for the feed bunk.

The supply hopper 10 comprises a container having a vertical side wall 15 and an associated downwardly converging side wall 16. A front end wall 17 and rear end wall 18 are provided to complete the four walls of the hopper container. A semi-cylindrical bottom 19 is provided to receive a substantially corresponding auger 21, therein. The vertical side wall 15 tends to prevent the feed from bridging and otherwise caking and clogging in the hopper, and tends to assure a smooth flow of loose feed through the hopper.

The auger 21 has its shaft end portion 22, see FIG. 3, extending outwardly through an aperture in end wall 17 and journalled in a bearing pedestal 23, through means of a ball bearing generally indicated at 24. The inner race of said ball bearing is press-fit onto auger shaft end 22 for rotation therewith; and the outer race is fixedly mounted in the bearing pedestal 23 by means of set screw 25.

The ball bearing 24 extends inwardly into the auger shaft wall aperture, and the outer race of the ball bearing is slidably received in a hub 26 which is welded to the inner periphery of said aperture, whereby the hopper container is rotatably mounted on said outer race for rotating or tilting the hopper container from an upright position to a tilted or dumping position substantially 90 degrees from said upright position as indicated by the dotted line position, numbered 27 in FIG. 4. This tilted position also serves as a weather protection position as from the accumulation therein of rain, ice or snow.

Therefore, while the auger shaft is rotatable in ball bearing 24, the hopper container is revolvable on and around said ball bearing 24.

The bearing pedestal 23 is mounted on a 3-legged support, generally indicated at 28, by means of bolts such as indicated at 29, see FIG. 4. Said support 28 comprises a tripod arrangement of telescopically adjustable legs 31, 32 and 33 welded at their converging upper ends to a plate 34. Adjusting means 30 are provided on said legs.

The rear portion of the hopper is rollably supported on support means generally indicated at 35, see FIG. 3. The semi-cylindrical hopper bottom 19 rolls on spaced rollers 36, and 37 not shown, journalled in the top portion of said support 35. Said support 35 is provided with telescopically adjustable leg members 38, and 39 not shown. Leg 38 and leg 31 are welded on a common base plate 41; and leg 39 and leg 33 are welded on a companion base plate 42.

The rear wall 18 of hopper 10 is apertured, at 43, in axial alignment with the auger shaft aperture in the front wall 17, see FIG. 3. A tubular extension or hub 44 is welded around said aperture, extending away from said end wall, see FIG. 3.

Control means, generally indicated at 40, are provided slidably engageable on said hub 44, for controlling the rotation of a delivery tube to be hereinafter described.

Said delivery tube control means 40 comprise a split flanged band, generally indicated at 45, consisting of a split sleeve 46 having a laterally extending split flange 47 on the inner end thereof. An annular corrugation or bead 48 is provided on the sleeve 46, intermediate the ends thereof. The band 45 is provided with apertured, oppositely disposed lugs, such as at 49, which receive the usual band clamp bolts and nuts, such as at 51, for tightening the flanged band 45. Said flanged band 45 is rotatably received on hub 44, the hub extending short of the bead 48, and the flange 47 slidably engaging the hopper wall 18.

To retain the flanged band 45 on the hub 44, a plurality of diametrically opposite offset brackets, such as indicated at 52, are provided, bolted to the hopper wall 18, such as by bolts 53. The body portion of each bracket is bolted to the hopper wall, whereas the offset portion of the bracket extends over the flange 47 and slidably engages therewith.

A radially disposed channel element 54 is welded on the outer end portion of said flanged band 45. A control handle 55 is somewhat loosely received between the flanges of said channel element 54. Said handle 55 is secured in said channel element through means of a bolt 56 passing through aligned apertures in said element and handle, respectively. A nut 57 is provided for said bolt.

Disposed around said bolt, between the handle and the nut 55, is a compression spring 58. The nut is tightened on the bolt until the compression spring is initially tensioned.

A latch 59, rigidly fixed on control handle 55, is normally in engagement with an operatively associated notched arcuate keeper 61, which is secured to hopper wall 18 as by welding means 62.

To disengage the latch 59 from the keeper 61, one merely tilts the control handle 55 backwardly, as shown by dotted line 60, against the tension of the spring 58, thereby retracting the latch clear of the keeper. One can then freely swing the control handle 55 to the right or left, to rotate the flange band 45 on the fixed hub 44, and re-engage the latch and keeper at any angular position desired.

A delivery tube, generally indicated at 63, communicates with the hopper 10 and comprises a plurality of aligned similar tubular sections, such as indicated at 64, connected by coupling band means such as generally indicated at 65, see FIGS. 1 and 2. Each tube section is provided at the opposite ends thereof with annular corrugations or beads, such as indicated at 66, see FIG. 3.

Each coupling band 65 comprises a split sleeve section 67 having spaced annular corrugations or beads 68, at the opposite ends thereof, that engage over the tube beads 66, see FIG. 1. The coupling bands are provided with apertured, oppositely disposed lugs, such as indicated at 69, which receive the usual band clamp bolts and nuts, such as indicated at 71, for tightening the coupling bands around the tube sections.

The first tube section is coupled to the hopper 10 through means of flanged band generally indicated at 45, see FIG. 3. The bead 48 thereof engages over the first tube bead 66, and the band clamp bolts and nuts 51 are drawn and tightened to secure said first section rigidly to the flanged band 45, while at the same time allowing said flanged band to rotate on hub 44.

Each tube section 64 is provided with a plurality of longitudinally spaced discharge openings such as indicated at 72. Said discharge openings are generally oblong, substantially similar and have their lowest wall or edge on a common line parallel to the axis of the tube. The lowest margins of the openings 72 are provided with small substantially similar notches, such as indicated at 73, for the discharge therefrom of feed concentrate such as in pellet, granular or powder form. The notches have their lowest wall or edge on a common line parallel to the axis of the tube section. The long axis of the oblong openings 72 is also parallel to the longitudinal axis of the tube 64.

FIG. 5 shows a modified delivery tube section 74 wherein progressively wider oblong discharge openings are diagonally disposed, relative to the longitudinal axis of the tube, such as indicated at 75 and 75a. The angular disposition, of each successive opening, decreases progressively as the openings are serially disposed along a tube section. In other words, in a horizontally disposed tube, while the diagonal openings are progressively wider, their highest wall portions are all on the same horizontal elevation, and their lowest wall portions are all on another common horizontal elevation, thereby requiring each successive diagonally disposed opening to tilt backwardly a little more than its predecessor. Note that diagonal angle B is less than diagonal angle A. In addition, the diagonal openings have their leading portions lower than their trailing portions. The more limited lower portions of the openings allow the facile discharge therefrom of feed concentrate, whereas the openings, as a whole, allow the coarse folder to flow abundantly therefrom.

FIG. 6 shows a modified delivery tube section 76 showing progressively wider isosceles triangular discharge openings, in a horizontally disposed tube, such as indicated at 77. The triangular openings are arranged with their apexes disposed downwardly, are of the same height, have their apexes at the same horizontal elevation, but their upwardly disposed bases become progressively wider from the first triangular opening at one end of the tube section to the last triangular opening at the remote other end of the tube section.

FIG. 7 shows a modified delivery tube 64a, wherein progressively wider oblong discharge openings 72a, 72b, and 72c, respectively, are provided with progressively wider notches 73a, 73b, and 73c, respectively. The long axes of said oblong discharge openings are axially aligned and parallel to the longitudinal axis of the tube 64a. The lowest walls of said discharge openings are all on a common line parallel to the longitudinal axis of the tube 64a, thereby said walls are disposable at the same elevation. The progressively wider notches also have their lowest wall portions on a common line parallel to the longitudinal axis of the tube 64a, thereby said notch wall portions are disposable on the same elevation.

As is best shown in FIGS. 1 and 2, the delivery tube 63 is supported on longitudinally spaced upright support frames such as generally indicated at 13, mounted on and astraddle the feed bunk 12, and by pendent support frames such as indicated generally at 78, depending from the roof structure generally indicated at 14.

Upright support frames 13 comprise a pair of spaced tubular legs such as indicated at 79 and 81, see FIG. 2, having their lower end portions flattened and bored and secured to the vertical sides of feed bunk 12 by means of lag screws such as indicated at 82.

Said legs 79 and 81 are provided with sleeve elements 83 and 84, slidable on said legs, and have winged set screws 85 and 86, respectively, for adjustably fixing the position of said sleeves along said legs.

A pair of spaced bars 87 and 88 are welded across said sleeves. Said bars are disposed horizontally.

A pair of trunnioned rollers 89 and 91 are journalled across said bars. Said rollers are spaced from each other, and have their axes disposed in the same horizontal plane. The portions of the bars 87 and 88 between the rollers are arcuately cut-out, such as indicated at 92, to freely accommodate the disposition and support of the delivery tube 63 on said rollers.

Though not limited thereto, the delivery tube sections 64 are approximately 10 feet in length. The tubes are joined by means of a coupling band such as indicated at 65, see FIGS. 1 and 2. Said coupling bands are provided with spaced annular corrugations or beads 68 and 69. The upright support frames 13 are disposed longitudinally along the feed bunk 12 so that the rollers 89 and 91 engage the coupling bands 65 on the peripheral zone between the annular corrugations or beads thereof.

Figure 8:
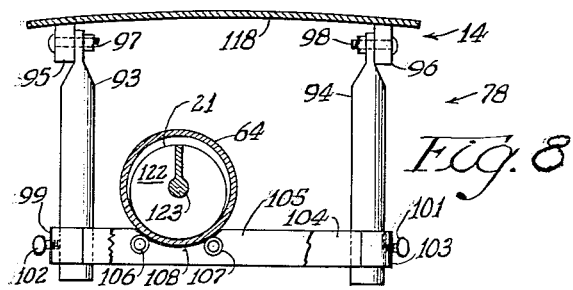
FIG. 8 is a section view taken on line 8—8 of FIG. 1, showing means for pendently supporting the tubular conveyor means from the roof structure.

Pendent support frames 78, depending from the roof structure 14, see FIG. 8, may be used in addition to the upright support frames 13, to support the delivery tubes 64 at the center thereof, or said pendent frames may be used as the only means for supporting said tubes, such as at the tube ends and/or at the center of said tubes.

Said pendent frames 78 comprise a pair of spaced tubular hangers 93 and 94, similar to upright frame legs 78 and 79, said tubular hangers being flattened at their upper ends and secured to longitudinal roof beams 95 and 96 by means of bolt and nut means, such as indicated at 97 and 98, respectively.

Said hangers 93 and 94 are provided with sleeve elements, see FIG. 8, such as indicated at 99 and 101 slidable on said hangers, and have winged set screws such as indicated at 102 and 103, respectively, for adjustably fixing the position of said sleeves along said hangers.

A pair of spaced bars 104 and 105 are welded across said sleeves, said bars being disposed horizontally.

A pair of trunnioned rollers 106 and 107 are journalled across said bars. Said rollers are spaced from each other, and have their axes disposed in the same horizontal plane. The portions of the bars between the rollers are arcuately cut-out, such as indicated at 108, to freely accommodate the disposition and support of the delivery tube 63 on said rollers.

The depending delivery tube arrangement provides a feed bunk construction that is free of obstructions for the cleaning thereof and for a freer movement of cows thereat.

The feed bunk generally indicated at 12, see FIGS. 1 and 2, comprises a bottom 109 and two vertical sides 111 and 112. Legs such as indicated at 113 and 114, spaced at any desired distance, and extending to the ground or the like, are provided to support said bunk above the ground or the like.

The roof structure generally indicated at 14 comprises suitably spaced and oppositely paired posts such as indicated at 115, see FIG. 1, secured to the opposite bunk sides 111 and 112, respectively, by bolt means such as at 116. Longitudinal roof beams 95 and 96 are connected to said oppositely paired posts 115 by means of bolt and nut means such as indicated at 117, respectively.

An arcuate cover plate 118, or the like, is disposed across the roof beams and secured thereto by lag screws such as indicated at 119, see FIG. 2. Said cover plate is of a width sufficiently large to extend beyond the sides of the bunk 12 to protect the bunk from rain and snow that would ordinarily fall therein. Furthermore, said roof structure protects the delivery tube 63 from rain and snow falling or running into the delivery tube through the discharge openings thereof.

Extending through said delivery tubes 63 and into the hopper 10 is an elongated auger generally indicated at 21.

The auger rests on the bottom portion of said delivery tube and hopper, and comprises a helical rib 122 on a shaft 123. The inner end portion 22 of said shaft 123, see FIG. 3, extends through an aperture in the hopper end wall 17, and is received in a ball bearing 24 which is carried in a pedestal 23, as hereinbefore described. Said auger 21, though shown broken off at 121, see FIG. 1, does in fact extend into and through the plurality of tube sections 64 forming the delivery tube 63.

On the outside end portion 22 of said auger shaft 123 is mounted a sprocket 124 fixed on said shaft by means of a set screw 125, see FIGS. 3 and 4, for transmitting drive power to auger 21.

A small agitator auger 126, see FIG. 3, is journalled in the hopper end walls, above conveying auger 21, through means of bearings 127 and 128 fixed in said end walls. A small sprocket 129 is fixed on the agitator auger shaft by means of set screw 131 for transmitting drive power to said agitator auger. The agitator auger maintains the feed, such as ensilage, loose, and prevents a caking thereof and clogging of the hopper.

Chain 132 is trained over said sprockets 124 and 129 for transmitting power between them.

A comparatively large sheave 133 is also fixed on the shaft of the auger agitator 126 by means of set screw 134.

End wall 17 is oversized so as to present a transverse margin or flange 135 beyond the sides and bottom of the hopper, see FIG. 4, for purposes hereinafterdescribed.

A longitudinally disposed shaft 136, see FIGS. 3 and 4, is journalled in said flange 135, as at 137, and in a lug 138 welded to the bottom of said hopper.

A motor mount plate 140, having spaced sleeves 139 and 141 welded thereon, is hinged on said shaft 136, through means of said shaft being engaged in said spaced sleeves. Said motor mount plate is adjustably angularly positioned through adjustable means generally indicated at 142. Said adjustable means comprises an eye-bolt 143, hinged in spaced lugs 144 and 145, on hopper 10, through means of pin 146, the free end of said eye-bolt being loosely received through an aperture in said plate and being provided with nuts 147 and 148 on each side of said plate. Obviously, to angularly displace the plate clockwise, nut 148 is retracted while nut 147 is advanced on eye-bolt 143. When the desired angular position is reached, the plate position is fixed by tightening both nuts against the plate.

A drive motor 149 is mounted on said hinged plate 140 through bolt and nut means such as indicated at 151. Said motor is provided with a sheave 152 fixed on the shaft 153 of said motor, to rotate therewith.

A belt 154 is trained over motor sheave 152 and sheave 133 to transmit power therebetween.

In summary, the means for driving the agitator auger 126 comprise motor 149, sheave 152 fixedly mounted on the shaft thereof, belt 154, and sheave 133 fixedly mounted on the shaft of agitator auger 126.

The drive means for conveying auger 21 comprises motor 149, sheave 152 fixed thereon, belt 154, rigidly connected sheave 133 and sprocket 129, belt 132, and sprocket 124 fixed on the shaft 22 of said conveying auger 21.

In view of the fact that the hopper 10 is rotatable about the conveyor auger 21, being revolvable on the fixed outer race of ball bearing 24, control means are provided, such as indicated generally at 155 to fix the angular or tilted position of the hopper as desired. Such control means comprise an arcuate slot 156, see FIG. 4, provided in hopper flange 135, said slot having the axis of the conveying auger 21 as its center, and extending counterclockwise from a zero point vertically below the axis of the auger 21 to a point approximately 90° therefrom. A stud bolt 157, disposed in said slot 156, is fixed in tripod plate 34. Wing nut 158 is threadedly received on the stud bolt 157 for tightening and fixing the hopper 10 in any desired angular position, limited by the extent of slot 156. Obviously, when the hopper is desired to be tilted from its upright position as shown in FIG. 4, wing nut 158 is loosened, the hopper rotated clockwise to a position as much as 90° sidewise as indicated by dotted line position 27, and fixed in said weather protective, or dumping position, by means of tightening the wing nut 158.

A projecting handle 159 is welded to the top edge of the hopper for manually tilting or rotating the hopper.

Operation

The normal operating position of the hopper 10 is upright, as shown in FIG. 1. In its upright position, feed is loaded in the hopper as a source of supply from which it is withdrawn by the auger for delivery to the feed bunk 12.

The normal operating position of the delivery tube 63 is as shown in FIG. 1, wherein the discharge openings are disposed sidewise of the tube. In this position the control handle 55 is disposed substantially vertical. As the motor driven auger 21 withdraws coarse feed from the hopper and advances and conveys it throughout the length of the tube, the feed spills out of the discharge openings 72 and into the feed bunk 12.

After the coarse feed, such as ensilage, is distributed, as above described, feed concentrate in granular or pellet form is dumped into the hopper 10 and is separately distributed over the coarse feed already deposited in the feed bunk 12. As the motor driven auger 21 withdraws the feed concentrate from the hopper and advances and conveys it throughout the length of the tube, the feed concentrate spills out of the discharge notches 73 and unto the coarse ensilage already in the bunk. Compared to the coarse feed requirement, the feed concentrate requirement is relatively small. In the absence of the discharge notches 73, the granular or pelleted feed concentrate would be discharged from the large discharge openings 72, adjacent the hopper, in large quantities, resulting in little or no feed concentrate being available and delivered to the discharge openings farther along the delivery tube. The presence of the small discharge notches provides means for metering and discharging only small quantities all along the length of the tube, that is, at points remote from the hopper as well as adjacent the hopper, because the smallness of the notches limits the discharge from the notches adjacent the hopper to a small quantity of feed concentrate, leaving the bulk of the concentrate to be delivered to more remote points.

Rotating the delivery tube 63 about its axis, by means of control handle 55, raises or lowers the openings 72, and notches 73, thereby controlling the discharge of feed from the openings and notches. As the discharge openings are lowered, feed discharged therefrom is increased; and as the discharge openings are raised, feed discharged therefrom is decreased. The discharge of coarse feed from the openings 72 and concentrate feed from the notches 73 can be controlled at the will of the operator through means of the control handle 55.

To provide for a somewhat even and uniform distribution of feed throughout the length of the tube, the modified discharge openings and associated discharge notches in FIGS. 5, 6 and 7, are provided.

To compensate for tube section similarity, each successive tube section is fixed in a position rotated slightly downwardly relative to a preceding tube section, as shown in FIG. 1 at 161. This relative rotational displacement of adjacent tube sections 64 assures a somewhat more even and uniform discharge of feed from throughout the length of delivery tube line 63, when the tube line is composed of a series of similarly constructed tube sections 64.

Having the small discharge slot openings 73 in the large discharge openings 72 provides an overall dual purpose discharge opening for the discharge of granulated or pelleted concentrate feed from the limited notch 73 opening as well as for the discharge of coarse feed such as ensilage from the large opening 72.

FIG. 6 shows triangular configured discharge openings 77 arranged with their apexes disposed downwardly. Such a configuration provides an opening inherently characterized with a dual purpose function. The pointed lowermost apex portion of the opening provides a small and limited discharge opening for feed concentrate, and a larger upper portion for the discharge of coarse feed.

FIG. 5 shows oblong openings 75 and 75a disposed diagonally in the side wall of the delivery tube. This construction likewise provides a discharge opening inherently characterized with a dual purpose function. The lowermost portion of the diagonal opening provides a somewhat limited discharge area for feed concentrate, and the larger upper portion for the discharge of coarse feed.

When the feed distribution to the feed bunk 12 has been accomplished, the operator can manipulate the hopper control means 155 to tilt or rotate the hopper sidewise to dotted line position 27 as shown in FIG. 4, to a protective position from the weather. Such tilted position prevents the accumulation of objectionable rain water, snow, or ice in the hopper, when not used, which would otherwise damage or freeze the auger in an inoperative status. Also the presence of water in the hopper would tend to dissolve the feed concentrate and harmfully effect its conveyance in the delivery tube and discharge from the tube openings. Said tilted position also serves as a dumping position, such as for dumping accumulated water, snow or ice, accidentally accumulated in the hopper.

Tilting the hopper sidewise, would normally also rotate therewith the connected delivery tube and openings 72 to their lowest or bottom position, thereby additionally assuring the non-entry of objectionable rain, snow or ice in the delivery tube 63. It is also to be noted that weather protection of the feed bunk and delivery tube is provided by the roof structure 14.

Having control means 155 for controlling the tilt or rotation of the hopper 10, and control means 40 for controlling the rotation delivery tube 63, provides control means for rotating the hopper and delivery tube as a combined unit (providing the wing nut 158 is loosened), or for rotating the delivery tube only, relative to the hopper, or for rotating the hopper only, relative to the delivery tube (providing the delivery tube control handle 55 is disengaged from its keeper and manually held stationary).

Some characteristic features of this invention are (a) the provision of an auger type tube feeder having a hopper rotatable about the axis of the conveyor auger; (b) the provision of an auger type tube feeder having independent rotational control means for the hopper and for the delivery tube thereof; (c) the provision of notches in tube discharge openings, whereby the dual purpose of discharging concentrate feed as well as coarse fodder can be discharged therefrom; (d) the provision of oblong discharge openings, diagonally disposed in the wall of the delivery tube; (e) the provision of triangular discharge openings in a feed delivery tube; (f) provision of an auger type tube conveyor having the delivery tube and supporting legs mounted astraddle the associated feed bunk; (g) the provision of an auger type tube conveyor having the delivery tube pending from an associated roof structure; (h) the provision of an auger type tube conveyor having novel coupling clamps for the several tube sections thereof; and (i) the provision of an elongated hopper having one vertical and one sloping side wall.

Obviously many modifications and variations of the present invention are possible in the light of the above teachings. It is therefore to be understood, that within the scope of the appended claims, the invention may be practised otherwise than as specifically described.

What is claimed and desired to be protected by Letters Patent of the United States is:

1. In a conveyor for forage having an upright hopper means having a feed inlet opening in the top wall thereof, a substantially horizontally disposed delivery tube means communicating with said hopper for receiving material from said hopper, and an auger means in said hopper and said delivery tube means for conveying material from said hopper and along said delivery tube means, support means for rotatably supporting said hopper and delivery tube means for rotation substantially about the longitudinal axis of said delivery tube means, longitudinally spaced discharge openings operatively disposed in a side wall of said delivery tube means, first rotation adjustment control means operatively associated with said delivery tube means for positioning the delivery tube means about its axis for controlling the flow of material through said discharge openings, and second rotation adjustment control means operatively associated with said hopper for positioning said hopper about its axis of rotation from an upright hopper position to a tilted dumping position, whereby said hopper can be rotatably tilted to one side for dumping accumulations from within said hopper and for preventing the entry and accumulation of rain, ice and snow in the hopper through said opening.

2. In a conveyor for forage having a hopper, a substantially horizontally disposed delivery tube communicating with said hopper, and an auger means in said hopper and said delivery tube means for conveying material from said hopper and along said delivery tube means, longitudinally spaced oblong discharge openings operatively disposed in a side wall of said delivery tube means, said oblong discharge openings being similarly diagonally disposed relative to the longitudinal axis of the delivery tube means, and said oblong discharge openings having their lowest edge on a common line parallel to the axis of said tube means, whereby to discharge forage from the openings as a whole and feed concentrates from the more limited lower portions thereof in particular, and wherein the diagonally disposed oblong discharge openings are progressively decreasingly tilted from a high angle adjacent said hopper away from said hopper to a low angle remote from said hopper.

References Cited in the file of this patent

UNITED STATES PATENTS

| | | |
|---|---|---|
| 1,095,489 | Alford | May 5, 1914 |
| 2,345,804 | Gemberling et al. | Apr. 4, 1944 |
| 2,350,476 | Richey | June 6, 1944 |
| 2,657,831 | Pierce | Nov. 3, 1953 |
| 2,867,314 | Hansen | Jan. 6, 1959 |
| 2,970,568 | Johnson | Feb. 7, 1961 |
| 3,031,063 | Siebring | Apr. 24, 1962 |
| 3,031,064 | Kline | Apr. 24, 1962 |

OTHER REFERENCES

"Roto-Tube Bunk Feeder," October 21, 1958, page 3.